(12) United States Patent
Seol et al.

(10) Patent No.: US 10,840,764 B2
(45) Date of Patent: Nov. 17, 2020

(54) MOTOR COOLING STRUCTURE (71) Applicants: Hyundai Motor Company, Seoul (KR); Kia Motors Corporation, Seoul (KR)

(72) Inventors: Woo Hyung Seol, Seoul (KR); Jae Won Ha, Gyeonggi-do (KR); Heung Seok Seo, Seoul (KR); Yeon Ho Kim, Gyeonggi-do (KR); Seokbin Hong, Gyeonggi-do (KR); Hee Ra Lee, Gyeonggi-do (KR); Yong Sung Jang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 16/152,379

(22) Filed: Oct. 4, 2018

(65) Prior Publication Data
US 2019/0173351 A1 Jun. 6, 2019

(30) Foreign Application Priority Data
Dec. 4, 2017 (KR) .................. 10-2017-0165191

(51) Int. Cl.
*H02K 5/20* (2006.01)
*H02K 5/18* (2006.01)
*H02K 9/19* (2006.01)
*H02K 11/25* (2016.01)

(52) U.S. Cl.
CPC ............ *H02K 5/20* (2013.01); *H02K 5/18* (2013.01); *H02K 9/19* (2013.01); *H02K 11/25* (2016.01)

(58) Field of Classification Search
CPC ............... H02K 5/18; H02K 5/20; H02K 9/19
USPC ................................................ 310/52–59
See application file for complete search history.

(56) References Cited

U.S. PATENT DOCUMENTS

| 2,862,120 | A | * | 11/1958 | Onsrud ............... | H02K 5/20 310/54 |
| 4,818,906 | A | * | 4/1989 | Kitamura ............. | H02K 9/19 310/58 |
| 5,664,916 | A | * | 9/1997 | Link ..................... | B23Q 1/70 310/54 |
| 5,982,071 | A | * | 11/1999 | Ehrick .................. | H02K 1/30 310/216.054 |
| 6,300,693 | B1 | * | 10/2001 | Poag .................... | H02K 5/20 310/54 |
| 6,900,561 | B2 | * | 5/2005 | Vlemmings .......... | H02K 5/18 310/58 |
| 7,675,209 | B2 | * | 3/2010 | Masoudipour ....... | H02K 5/20 310/57 |
| 8,183,723 | B2 | * | 5/2012 | Fee ....................... | H02K 5/20 165/156 |

(Continued)

*Primary Examiner* — Jeremy A Luks
(74) *Attorney, Agent, or Firm* — Mintz Levin Cohn Ferris Glovsky and Popeo, P.C.; Peter F. Corless (57) ABSTRACT

A motor cooling structure is provided. The structure includes a motor housing that has an inner wall, an outer wall, and a plurality of cooling fins which are disposed on the inner wall. An inlet boss is obliquely connected to the motor housing and an outlet boss is obliquely connected to the motor housing. The outlet boss is spaced apart from the inlet boss. Additionally, a first cooling channel and a second cooling channel are disposed between the inner wall and the outer wall, and are connected in parallel to the inlet boss and the outlet boss.

11 Claims, 6 Drawing Sheets

(56) References Cited

U.S. PATENT DOCUMENTS

| | | | | |
|---|---|---|---|---|
| 8,183,724 B2* | 5/2012 | Rodriguez Rodriguez | ............... | H02K 5/20 310/54 |
| 8,973,363 B2* | 3/2015 | Rohwer | ................ | H02K 5/20 60/714 |
| 9,225,224 B2* | 12/2015 | Memminger | ........... | H02K 5/20 |
| 9,331,551 B2* | 5/2016 | Ikeda | ...................... | H02K 9/19 |
| 9,525,325 B2* | 12/2016 | Chamberlin | ............ | H02K 9/19 |
| 9,531,242 B2* | 12/2016 | Kulkarni | .................. | H02K 5/20 |
| 9,819,247 B2* | 11/2017 | Leberle | .................... | H02K 5/20 |
| 9,893,593 B2* | 2/2018 | Sugimoto | ............. | H02K 9/197 |
| 9,935,519 B2* | 4/2018 | Buttner | ................... | H02K 5/20 |
| 9,948,157 B2* | 4/2018 | Lucchi | .................... | H02K 5/20 |
| 10,230,287 B2* | 3/2019 | Sever | ...................... | H02K 5/18 |
| 2007/0188028 A1* | 8/2007 | Vasilescu | .............. | H02K 49/04 310/54 |
| 2008/0284263 A1* | 11/2008 | Dessirier | ................. | H02K 5/20 310/54 |
| 2012/0318479 A1* | 12/2012 | Chang | ................... | F28F 13/06 165/104.19 |
| 2016/0294231 A1* | 10/2016 | Andres | ................... | H02K 1/20 |
| 2017/0302137 A1* | 10/2017 | Kim | ....................... | H02K 5/20 |

* cited by examiner

MOTOR COOLING STRUCTURE

CROSS-REFERENCE TO RELATED APPLICATION

This application claims priority to Korean Patent Application No. 10-2017-0165191, filed on Dec. 4, 2017, the disclosure of which is incorporated herein in its entirety by reference.

TECHNICAL FIELD

The present disclosure relates to a motor cooling structure and, more particularly, to a motor cooling structure in which a first cooling channel and a second cooling channel are connected in parallel to improve cooling performance.

RELATED ART

Generally, an electric motor is an electrical machine that converts electrical energy into mechanical energy and is used in various fields. Electric motors are widely used in transportation machines such as vehicles. Examples of electric motors used in vehicles include a traction motor that supplies driving force when a hybrid vehicle is driven in a pure electric vehicle (EV) mode (with an engine off), a motor generator in which a motor and a generator are mechanically combined, and a hybrid starter generator (HSG) that starts an engine using electrical energy from a battery and charges the battery with electrical energy generated by the power of the engine.

The electric motors applied to transportation machines such as vehicles are small and lightweight. Due to the small size and low weight, the generation of heat in the electric motor is increased, and thus, a cooling structure for improving the cooling performance of the electric motor is being researched and developed. For example, a cooling structure in the related art of a high voltage motor such as a high voltage HSG includes a cooling channel formed in the interior of a motor housing, a plurality of cooling fins formed on an inner wall of the motor housing, and an inlet boss and an outlet boss connected to the cooling channel.

The cooling channel is divided by a single partition wall formed on an outer wall, and the partition wall is disposed between the inlet boss and the outlet boss. Accordingly, in a conventional motor cooling structure, the cooling channel is divided by the partition wall to allow a coolant to flow annularly from the inlet boss to the outlet boss. The inlet boss and the outlet boss are disposed adjacent to each other on the circumference of the motor housing, and the inlet boss and the outlet boss are formed in a normal direction (e.g., a radial direction) of the motor housing.

In the conventional motor cooling structure, when the motor housing is manufactured by a die casting method, a gap is generated between the partition wall and the inner wall of the motor housing due to manufacturing tolerance and the like, unless the partition wall is precisely machined. Thus, the coolant may flow through the gap of the partition wall, and thus a space around the partition wall becomes a passage through which the coolant flows. However, the peripheral region of the partition wall does not substantially contribute to the cooling of the motor since a path of movement of the coolant therein is relatively short. Accordingly, a cooling loss occurs in the peripheral region of the partition wall.

When the cooling fins are additionally provided or the size of the motor housing is increased in the conventional motor cooling structure to improve cooling performance, the amount of the coolant that flows to the peripheral region of the partition wall is increased, which leads to a reduction in cooling performance. In addition, since the inlet boss and the outlet boss in the conventional motor cooling structure are formed in the normal direction of the motor housing, the coolant collides with the inner wall or the outer wall when the coolant flows into the inlet boss or is discharged from the outlet boss, which causes a pressure loss.

SUMMARY

An aspect of the present disclosure provides a motor cooling structure, in which a first cooling channel and a second cooling channel are connected in parallel to improve cooling performance.

According to an aspect of the present disclosure, a motor cooling structure may include: a motor housing having an inner wall, an outer wall, and a plurality of cooling fins disposed on the inner wall; an inlet boss obliquely connected to the motor housing; an outlet boss obliquely connected to the motor housing and spaced apart from the inlet boss; and a first cooling channel and a second cooling channel disposed between the inner wall and the outer wall, and connected in parallel with respect to the inlet boss and the outlet boss.

Each of the inlet boss and the outlet boss may be inclined with respect to a tangent of the outer wall of the motor housing. The first cooling channel and the second cooling channel may have different arc lengths. In particular, a first arc length of the first cooling channel may be longer than a second arc length of the second cooling channel. A ratio of the first arc length and the second arc length may be in a range of about 6:4 to 8:2. The second cooling channel may have a plurality of protrusions disposed on the outer wall, and the plurality of protrusions may be arranged alternatingly with the plurality of cooling fins. The plurality of protrusions may be spaced apart from the inner wall.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" and "approximately" are understood as within a range of normal tolerance in the art, for example within 2 standard deviations of the mean. "About" and "approximately" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about" or "approximately."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
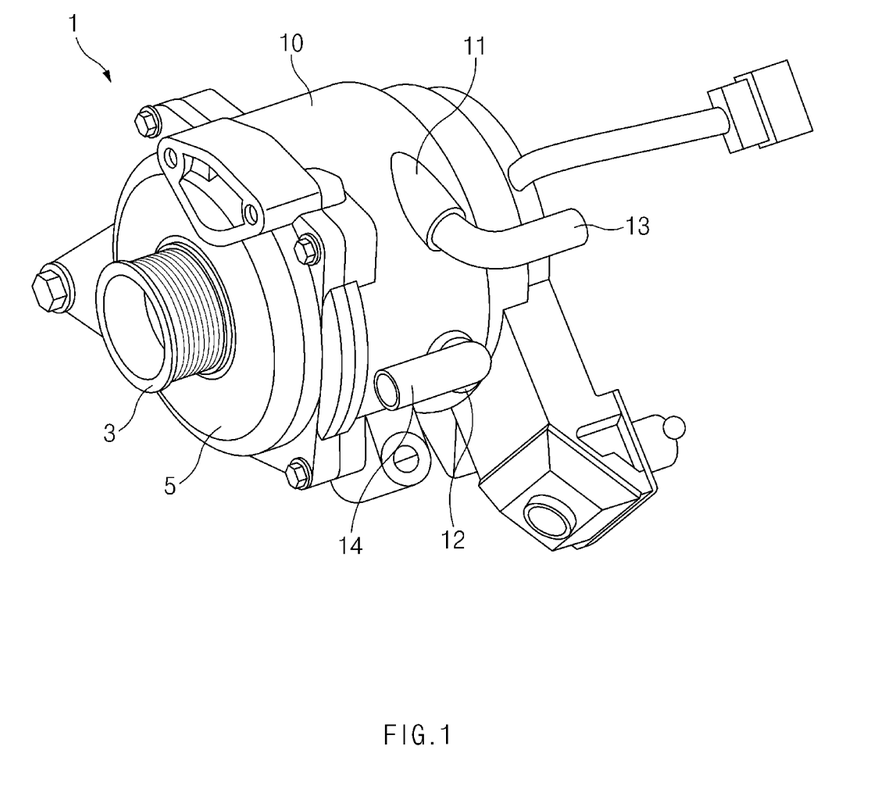
FIG. 1 illustrates a perspective view of a hybrid starter generator (HSG) to which a motor cooling structure according to an exemplary embodiment of the present disclosure is applicable.

FIG. 1 illustrates an example of a motor to which a motor cooling structure according to an exemplary embodiment of the present disclosure is applicable. The motor in FIG. 1 may be a hybrid starter generator (HSG). A motor 1 may include a motor housing 10 within which a shaft (not shown), a rotor (not shown), a stator (not shown), a stator coil (not shown), and the like are enclosed, a cover 5 mounted on a front end of the motor housing 10, and a pulley 3 connected to the shaft of the rotor. The pulley 3 may be connected to a crank pulley of an engine through a belt.

As illustrated in FIGS. 2 to 5, the motor housing 10 may include cooling channels 31 and 32 in the interior thereof. The motor housing 10 may have an inlet boss 11 and an outlet boss 12 that each communicates with the cooling channels 31 and 32. The inlet boss 11 may be connected to a coolant inlet-side pipe 13, and the outlet boss 12 may be connected to a coolant outlet-side pipe 14.

Figure 2:
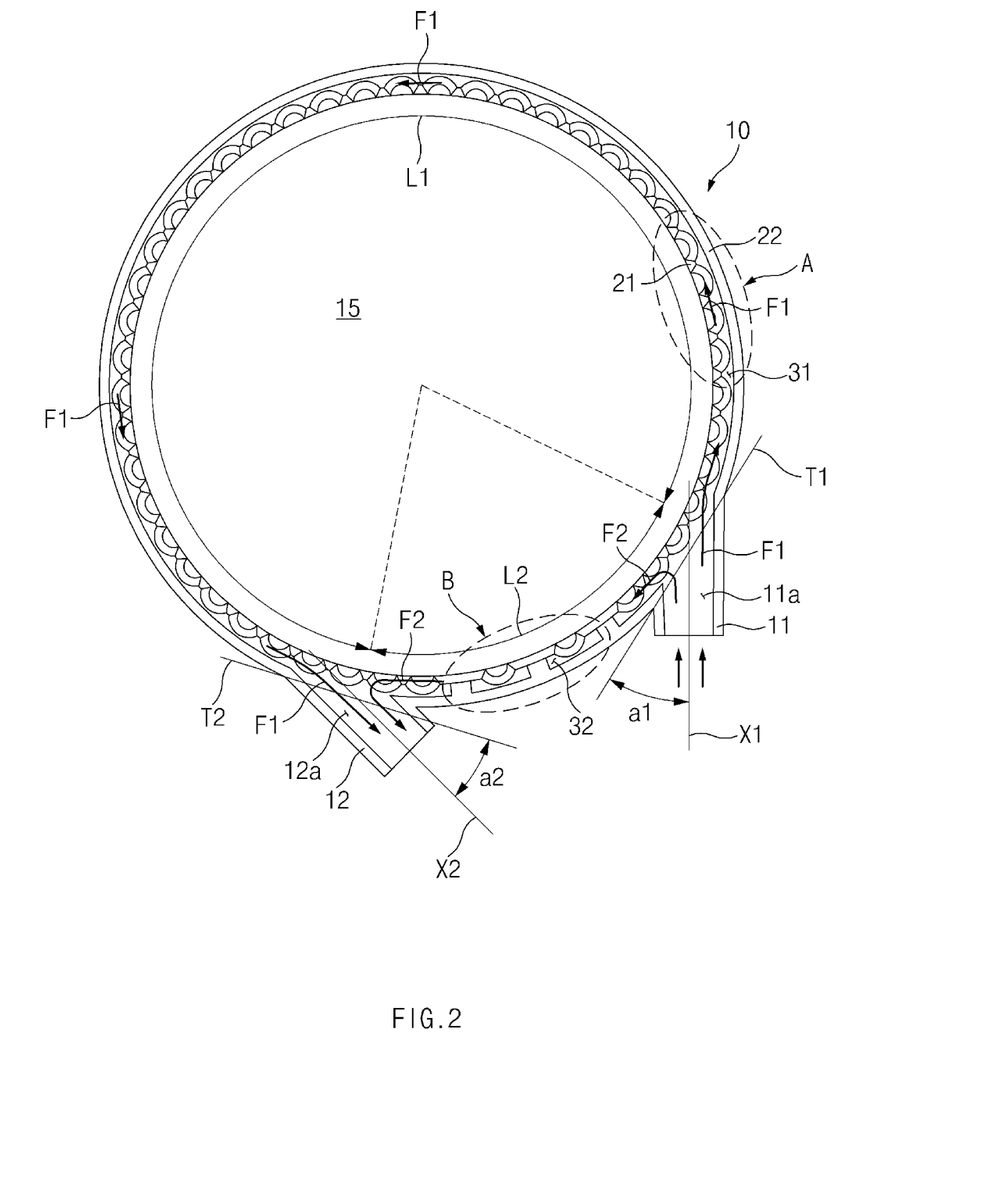
FIG. 2 illustrates a cross-sectional view of a motor cooling structure according to an exemplary embodiment of the present disclosure.

Referring to FIG. 2, a motor cooling structure according to an exemplary embodiment of the present disclosure may include the motor housing 10 within which a shaft (not shown), a rotor (not shown), a stator (not shown), a stator coil (not shown), and the like may be enclosed, and the cooling channels 31 and 32 may be formed between an inner wall 21 and an outer wall 22 of the motor housing 10. The cooling channels 31 and 32 may define an annular, continuous path. The motor housing 10 may be a cylindrical structure having a receiving space 15 (e.g., a cavity) within which the shaft, the rotor, the stator, the stator coil, and the like may be disposed.

The motor housing 10 may include the inner wall 21 and the outer wall 22 which may be spaced apart from each other in a radial direction. A plurality of cooling fins 28 may be formed on the inner wall 21, and the plurality of cooling fins 28 may be spaced apart from each other along the inner wall 21. The inner wall 21 may be relatively thinner than the outer wall 22. The cooling channels 31 and 32 may be formed between the inner wall 21 and the outer wall 22, and the cooling channels 31 and 32 may have serpentine paths defined by the plurality of cooling fins 28.

The inlet boss 11 and the outlet boss 12 may be spaced apart from each other in a circumferential direction of the motor housing 10. The inlet boss 11 may be connected to the outer wall 22 of the motor housing 10, and the inlet boss 11 may be integrally formed with the outer wall 22 when manufactured by a die casting method or the like. The inlet boss 11 may have an inlet port 11a that communicates with the cooling channels 31 and 32, and a coolant may flow into the cooling channels 31 and 32 through the inlet port 11a.

According to an exemplary embodiment of the present disclosure, the inlet boss 11 may be obliquely connected to the outer wall 22 of the motor housing 10. An axis X1 of the inlet boss 11 may be inclined at a predetermined angle a1 with respect to a tangent T1 of the outer wall 22 that extends from an intersection between the axis X1 and the outer wall 22. For example, the axis X1 of the inlet boss 11 may be inclined at approximately 45° with respect to the tangent T1 of the outer wall 22. Since the inlet boss 11 may be obliquely connected to the outer wall 22, this structure may prevent or minimize the collision of the coolant introduced through the inlet port 11a of the inlet boss 11 with the inner wall 21 and the outer wall 22, thereby minimizing a pressure loss.

The outlet boss 12 may be connected to the outer wall 22 of the motor housing 10, and the outlet boss 12 may be integrally formed with the outer wall 22 when manufactured by a die casting method or the like. The outlet boss 12 may have an outlet port 12a that communicates with the cooling channels 31 and 32, and the coolant may be discharged from the cooling channels 31 and 32 through the outlet port 12a.

According to an exemplary embodiment of the present disclosure, the outlet boss 12 may be obliquely connected to the outer wall 22 of the motor housing 10. An axis X2 of the outlet boss 12 may be inclined at a predetermined angle a2 with respect to a tangent T2 of the outer wall 22 that extends from an intersection between the axis X2 and the outer wall 22. For example, the axis X2 of the outlet boss 12 may be inclined at approximately 45° with respect to the tangent T2 of the outer wall 22. Since the outlet boss 12 may be obliquely connected to the outer wall 22, this structure may prevent or minimize the collision of the coolant discharged through the outlet port 12*a* of the outlet boss 12 with the inner wall 21 and the outer wall 22, thereby minimizing a pressure loss.

According to an exemplary embodiment, the inlet boss 11 and the outlet boss 12 may be symmetrically disposed on the circumference of the motor housing 10. Further, the inlet boss 11 and the outlet boss 12 may be spaced apart from each other on the circumference of the motor housing 10 in the circumferential direction of the motor housing 10 to allow the first cooling channel 31 and the second cooling channel 32 to be continuously arranged in the circumferential direction of the motor housing 10 and to provide an annular, continuous passage.

The first cooling channel 31 and the second cooling channel 32 may be connected in parallel, in terms of the fluid flow, with respect to the inlet port 11*a* of the inlet boss 11 and the outlet port 12*a* of the outlet boss 12. Specifically, the inlet port 11*a* of the inlet boss 11 may be a common inlet port of the first cooling channel 31 and the second cooling channel 32 to divide the first cooling channel 31 and the second cooling channel 32 in the inlet port 11*a* of the inlet boss 11. The outlet port 12*a* of the outlet boss 12 may be a common outlet port of the first cooling channel 31 and the second cooling channel 32 to merge the first cooling channel 31 and the second cooling channel 32 in the outlet port 12*a* of the outlet boss 12. Thus, the coolant may be divided in the inlet port 11*a* to flow into the first cooling channel 31 and the second cooling channel 32, and a portion of the coolant that flows through the first cooling channel 31 and a portion of the coolant that flows through the second cooling channel 32 may be combined at the outlet port 12*a* to be discharged from the outlet port 12*a* to the outside.

According to an exemplary embodiment of the present disclosure, the first cooling channel 31 and the second cooling channel 32 may have different arc lengths L1 and L2 depending on a distance between the inlet boss 11 and the outlet boss 12. In particular, a first arc length L1 of the first cooling channel 31 may be longer than a second arc length L2 of the second cooling channel 32. Thus, the second cooling channel 32 may provide a relatively short path of transportation of the coolant, compared to the first cooling channel 31. For example, a ratio L1:L2 of the first arc length L1 of the first cooling channel 31 and the second arc length L2 of the second cooling channel 32 may be in a range of about 6:4 to 8:2.

Since the first cooling channel 31 and the second cooling channel 32 may be connected in parallel to the inlet boss 11 and the outlet boss 12, the coolant may be distributed from the inlet port 11*a* of the inlet boss 11 to the first cooling channel 31 and the second cooling channel 32. Thus, a portion of the coolant may flow through the first cooling channel 31 in a first flow direction F1, and the remaining portion of the coolant may flow through the second cooling channel 32 in a second flow direction F2. The portion of the coolant that flows in the first flow direction F1 and the remaining portion of the coolant that flows in the second flow direction F2 may merge at the outlet port 12*a* of the outlet boss 12 to be discharged therefrom. As illustrated in FIG. 2, the first flow direction F1 and the second flow direction F2 may be opposite to each other.

In addition, since the inlet boss 11 and the outlet boss 12 may be obliquely connected to the outer wall 22 of the motor housing 10, and the inlet boss 11 and the outlet boss 12 are symmetrical to each other, a distance between the inlet port 11*a* of the inlet boss 11 and the outlet port 12*a* of the outlet boss 12 may be increased, compared to a corresponding structure according to the related art. Thus, the parallel connecting structure of the first cooling channel 31 and the second cooling channel 32 may be effectively achieved.

Figure 3:
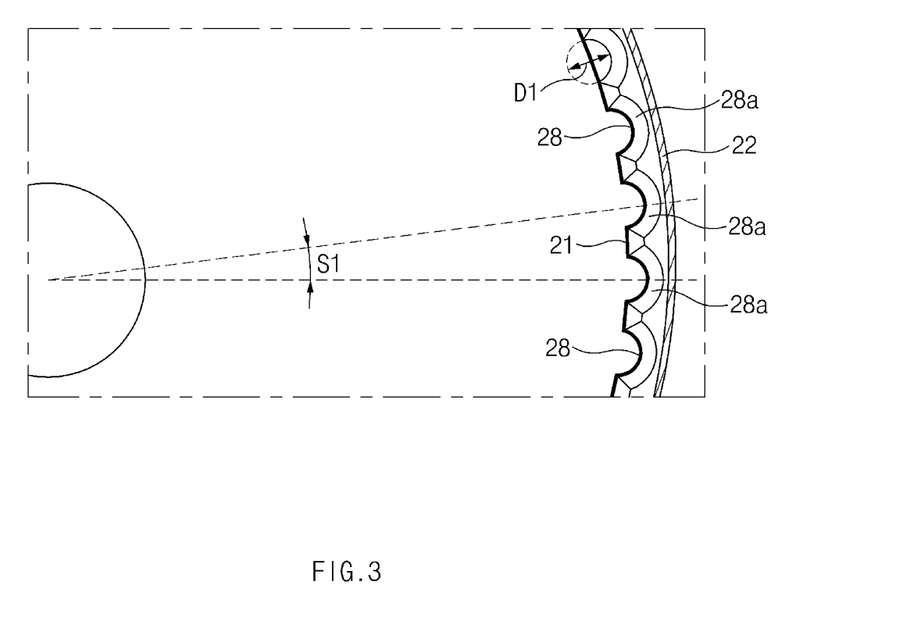
FIG. 3 illustrates an enlarged view of portion A illustrated in FIG. 2 according to an exemplary embodiment of the present disclosure.

As described above, since the first cooling channel 31 and the second cooling channel 32 may be connected in parallel with respect to the inlet boss 11 and the outlet boss 12, the size of the cooling fins 28 may be increased and gaps between the cooling fins 28 may be reduced to increase the number of the cooling fins 28, compared to the related art, and thus cooling performance may be improved. Referring to FIG. 3, the cooling fin 28 may have an arc shape. For example, a diameter D1 of the cooling fin 28 may be approximately 6 mm, and a gap S between the cooling fins 28 may be defined by approximately 7.5°.

Figure 4:
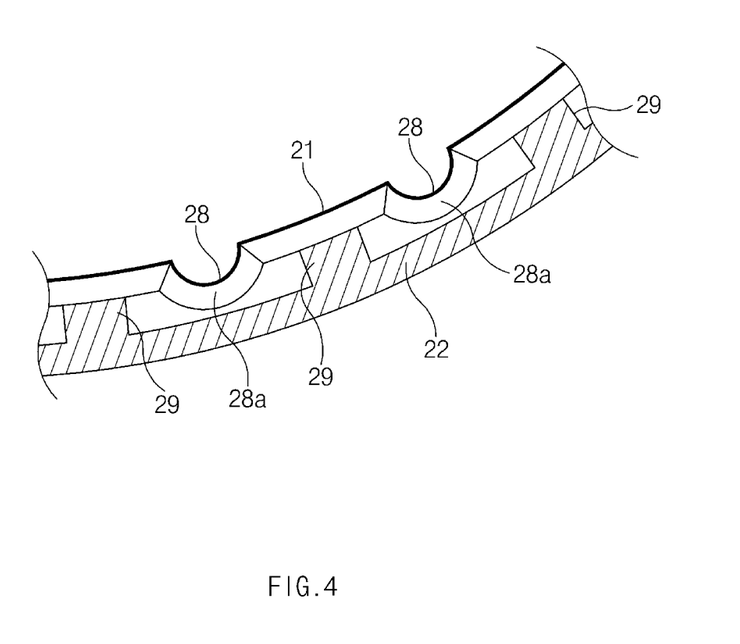
FIG. 4 illustrates an enlarged view of portion B illustrated in FIG. 2 according to an exemplary embodiment of the present disclosure.

Referring to FIGS. 2 and 4, the second cooling channel 32 may include a plurality of protrusions 29 formed on the outer wall 12, and the plurality of protrusions 29 may protrude toward the inner wall 11. The plurality of protrusions 29 may be spaced apart from each other on the outer wall 12. Each of the protrusions 29 may be spaced apart from the inner wall 11. The plurality of protrusions 29 may be arranged alternatingly with the cooling fins 28 of the inner wall 21 to form the serpentine channel of the second cooling channel 32 effectively.

Although the arc length L2 of the second cooling channel 32 may be shorter than the arc length L1 of the first cooling channel 31, the cooling performance of the second cooling channel 32 may be improved by the plurality of protrusions 29. The plurality of protrusions 29 may be three protrusions by which the cooling performance of the second cooling channel 32 may be optimized, but the present disclosure is not limited thereto.

Figure 5:
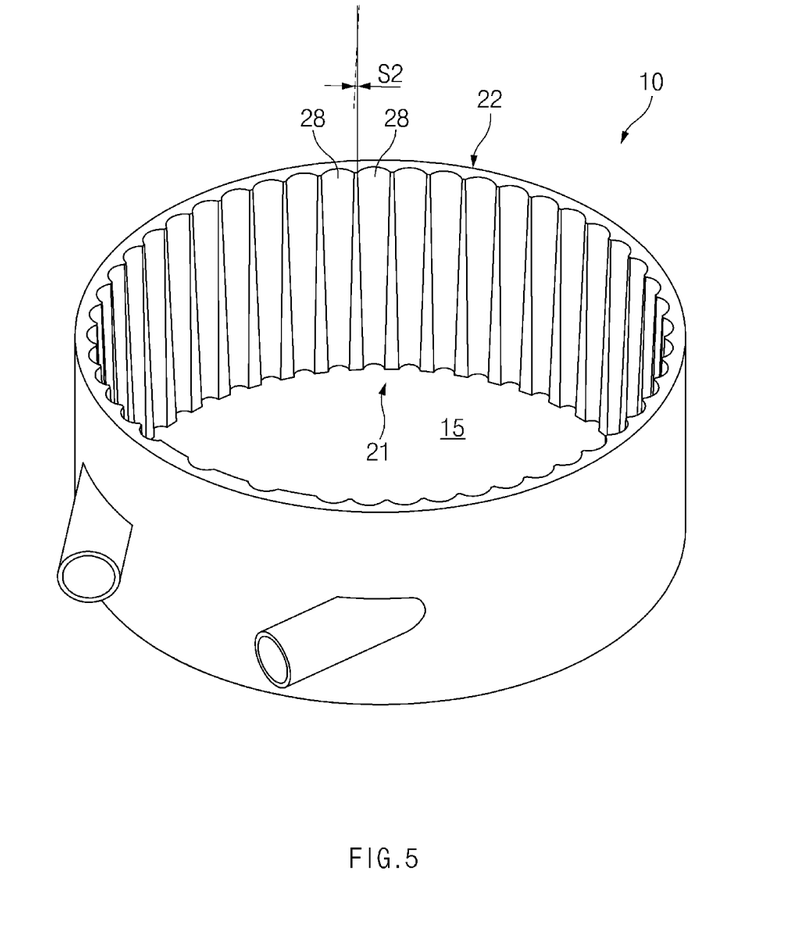
FIG. 5 illustrates a perspective view of a motor housing in a motor cooling structure according to an exemplary embodiment of the present disclosure.

Referring to FIG. 5, the inner wall 21 and the outer wall 22 of the motor housing 10 may be manufactured by a die casting method. To allow a mold to be more easily extracted, each cooling fin 28 may have a predetermined draft angle S2. For example, the draft angle S2 may be about 1.5°. Thus, as illustrated in FIGS. 3 and 4, each cooling fin 28 may have a tapered surface 28*a* which is inclined in a lengthwise direction of the motor housing 10.

Figure 6:
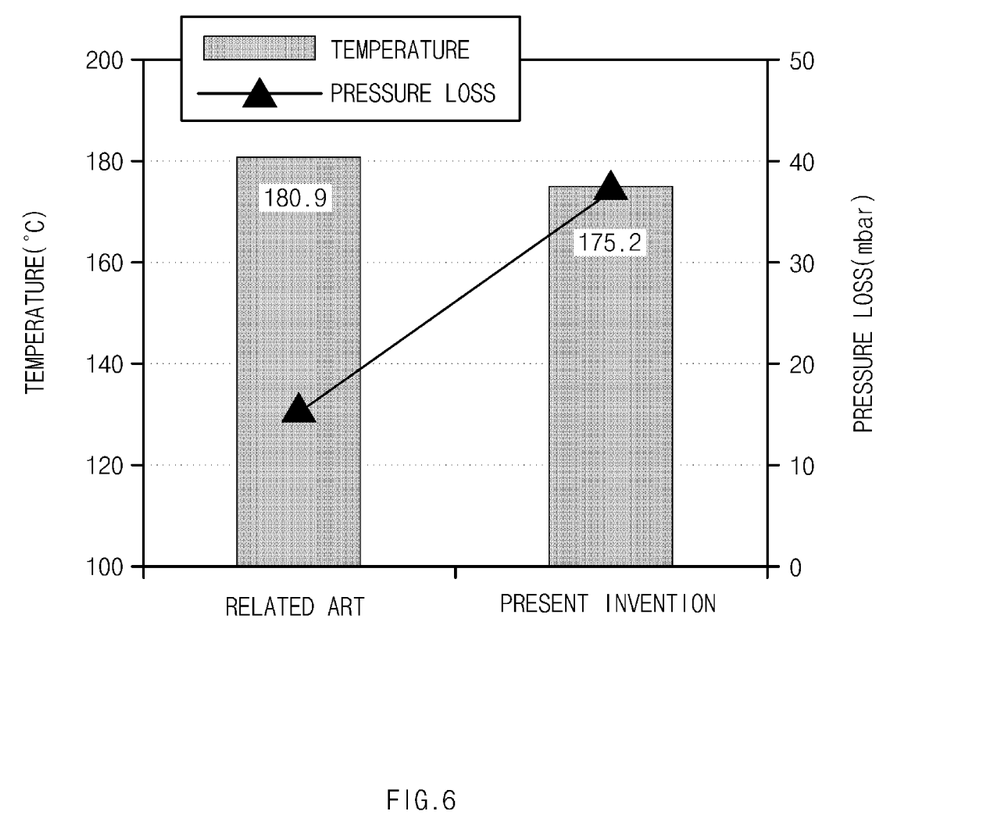
FIG. 6 illustrates a graph of cooling performance and pressure loss in a motor cooling structure according to an exemplary embodiment of the present disclosure and a motor cooling structure according to the related art.

FIG. 6 illustrates a graph of comparison between cooling performance and pressure loss of a hybrid starter generator (HSG) having a motor cooling structure according to an exemplary embodiment of the present disclosure and those of an HSG having a motor cooling structure according to the related art. Referring to FIG. 6, a temperature value measured by a coil temperature sensor of the HSG to which the motor cooling structure according to the exemplary embodiment of the present disclosure has been applied was 175.2° C., while a temperature value measured by a coil temperature sensor of the HSG to which the motor cooling structure according to the related art has been applied was 180.9° C. Thus, the temperature in the exemplary embodiment of the present disclosure was reduced by 3.1% (5.7° C.), compared to the related art.

In addition, the pressure loss of the HSG to which the motor cooling structure according to the exemplary embodiment of the present disclosure has been applied was 37.7 mbar, while the pressure loss of the HSG to which the motor cooling structure according to the related art has been applied was 15.9 mbar. Thus, the pressure loss in the exemplary embodiment of the present disclosure was increased, compared to the related art. Since a design upper limit for the pressure loss of the HSG is 50 mbar, the HSG according to the exemplary embodiment of the present disclosure was capable of satisfying the design requirement for the pressure loss while making an improvement in the cooling performance, durability, and the like.

As set forth above, by obliquely connecting the inlet boss and the outlet boss to the motor housing, the first cooling channel and the second cooling channel may be connected in parallel with respect to the inlet boss and the outlet boss to allow the coolant to flow through the parallel structure of the first cooling channel and the second cooling channel, whereby cooling performance may be improved.

In addition, the second cooling channel may have the plurality of protrusions that protrude from the outer wall which are arranged alternatingly with the cooling fins of the inner wall to improve cooling performance of the second cooling channel and thus improve the overall cooling performance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A motor cooling structure, comprising:
    a motor housing having an inner wall and an outer wall, and wherein the motor housing includes a plurality of cooling fins disposed on the inner wall;
    an inlet boss obliquely connected to the motor housing;
    an outlet boss obliquely connected to the motor housing, and spaced apart from the inlet boss; and
    a first cooling channel and a second cooling channel disposed between the inner wall and the outer wall, and connected in parallel with respect to the inlet boss and the outlet boss,
    wherein each of the plurality of cooling fins extends along a longitudinal axis of the motor housing,
    wherein each of the plurality of cooling fins has a predetermined draft angle relative to the longitudinal axis of the motor housing, and
    wherein each of the plurality of cooling fins has a tapered surface which is inclined relative to the longitudinal axis of the motor housing.

2. The motor cooling structure according to claim 1, wherein the inlet boss is inclined by a predetermined inlet inclination angle with respect to a tangent of the outer wall of the motor housing.

3. The motor cooling structure according to claim 2, wherein the inlet inclination angle is about 45°.

4. The motor cooling structure according to claim 1, wherein the outlet boss is inclined by a predetermined outlet inclination angle with respect to a tangent of the outer wall of the motor housing.

5. The motor cooling structure according to claim 4, wherein the outlet inclination angle is about 45°.

6. The motor cooling structure according to claim 1, wherein the first cooling channel and the second cooling channel have different arc lengths.

7. The motor cooling structure according to claim 1, wherein a first arc length of the first cooling channel is longer than a second arc length of the second cooling channel.

8. The motor cooling structure according to claim 7, wherein a ratio of the first arc length and the second arc length is in a range of 6:4 to 8:2.

9. The motor cooling structure according to claim 1, wherein the second cooling channel has a plurality of protrusions disposed on the outer wall, and the plurality of protrusions are arranged alternatingly with the plurality of cooling fins.

10. The motor cooling structure according to claim 9, wherein the plurality of protrusions are spaced apart from the inner wall.

11. The motor cooling structure according to claim 9, wherein the plurality of protrusions include 3 protrusions.

* * * * *